(12) United States Patent
Bandyopadhyay

(10) Patent No.: US 7,705,085 B2
(45) Date of Patent: *Apr. 27, 2010

(54) FLUOROELASTOMER COMPOSITION FOR COLD SHRINK ARTICLES

(75) Inventor: Pradip K. Bandyopadhyay, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 299 days.

This patent is subject to a terminal disclaimer.

(21) Appl. No.: 11/697,429

(22) Filed: Apr. 6, 2007

(65) Prior Publication Data

US 2008/0249240 A1 Oct. 9, 2008

(51) Int. Cl.
*C08L 27/12* (2006.01)

(52) U.S. Cl. ............... 524/544; 524/545; 524/546; 174/93

(58) Field of Classification Search ......... 524/544, 524/545, 546; 174/93
See application file for complete search history.

(56) References Cited

U.S. PATENT DOCUMENTS

| | | | |
|---|---|---|---|
| 4,188,352 A | 2/1980 | Suzuki et al. | |
| 4,645,801 A | 2/1987 | Barnhouse | |
| 4,942,906 A | 7/1990 | Igarashi et al. | |
| 5,157,412 A | 10/1992 | Kleinschmidt et al. | |
| 5,560,845 A | 10/1996 | Birmingham, Jr. et al. | |
| 5,804,630 A | 9/1998 | Heyer et al. | |
| 6,114,452 A | 9/2000 | Schmiegel | |
| 6,838,512 B2 | 1/2005 | Margl et al. | |
| 7,396,499 B2 | 7/2008 | Frankel et al. | |
| 7,511,222 B2 | 3/2009 | Taylor et al. | |
| 2003/0080457 A1 | 5/2003 | Corveleyn | |
| 2004/0249054 A1 | 12/2004 | Eggers et al. | |
| 2005/0214491 A1 | 9/2005 | Vora | |
| 2005/0215661 A1 | 9/2005 | Vora | |
| 2005/0277731 A1 | 12/2005 | Fukuda et al. | |
| 2007/0027236 A1 | 2/2007 | Bandyopadhyay et al. | |
| 2008/0248225 A1 | 10/2008 | Bandyopadhyay | |

FOREIGN PATENT DOCUMENTS

| | | |
|---|---|---|
| EP | 0750381 | 12/1996 |
| EP | 1251000 | 10/2002 |
| JP | 57126663 | 8/1982 |
| JP | 62084153 | 4/1987 |
| JP | 63081144 | 4/1988 |
| JP | 1060214 | 3/1989 |
| JP | 2028239 | 1/1990 |
| SU | 1024480 | 6/1983 |
| WO | WO 03/058787 | 7/2003 |
| WO | WO 2007/016198 A1 | 2/2007 |

OTHER PUBLICATIONS

Albin, L. D.; Kosmala, J. L.; Stoskopf, A. H. "Fluoroelastomer—SR Blends Offer Compounders New Choices." *Rubber and Plastics News* 11(8) (Nov. 9th, 1981): 28-30.

Nakamura, Y.; Mori, K.; Wada, K. "Adhesion of Fluoroelastomer to Nitrile or Epichlorohydrin Rubber During Cure." *International Polymer Science and Technology* 12(2) (1985): T49-55.

Nersasian, A. "Compatability of Fuel-Handling Rubbers with Gasoline/Alcohol Blends." *Elastomerics* 112(10) (1980): 26-30.

Standard: "Standard Test Methods for Vulcanized Rubber and Thermoplastic Elastomers—Tension[1]," *ASTM International*, Designation: D412-98a (Reapproved 2002), Jan. 2003, pp. 44-57.

Office Action for U.S. Appl. No. 11/697,449, dated Aug. 13, 2007.
Office Action for U.S. Appl. No. 11/697,449, dated Jan. 16, 2008.
Office Action for U.S. Appl. No. 11/697,449, dated Mar. 23, 2009.
Notice of Allowance for U.S. Appl. No. 11/697,449, dated Oct. 2, 2009.

*Primary Examiner*—Bernard Lipman
(74) *Attorney, Agent, or Firm*—Melanie G. Gover

(57) ABSTRACT

A composition includes an elastomeric composition. The elastomeric composition can include a fluoroelastomer composition, and the elastomeric composition is substantially free of an epichlorohydrin composition. The composition can further include a filler material which includes a reinforcement-grade carbon black. The composition can further include a peroxide curative.

20 Claims, 3 Drawing Sheets

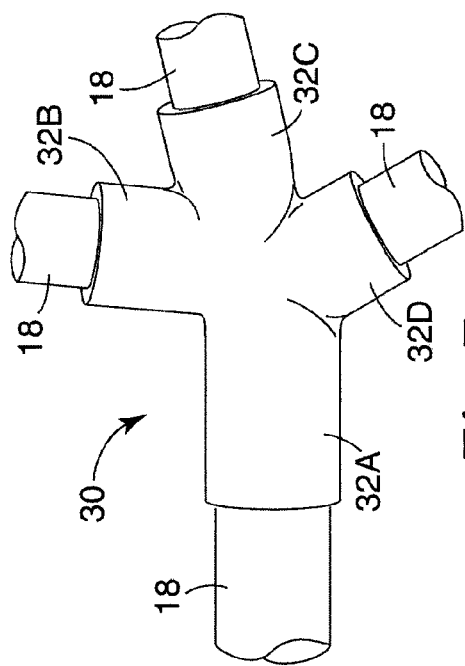
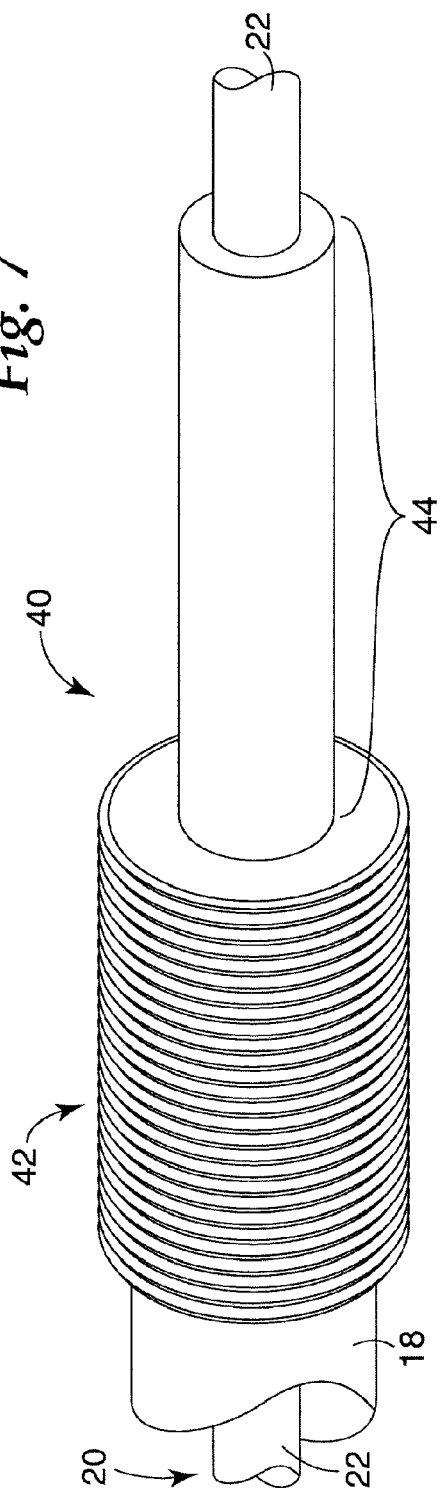

und FLUOROELASTOMER COMPOSITION FOR COLD SHRINK ARTICLES

FIELD

The present invention relates generally to compositions for cold shrinkable articles for use in various applications. In particular, the present invention relates to compositions for cold shrinkable articles formed from a composition including a fluoroelastomer.

BACKGROUND

Cold shrinkable articles are used in a variety of different applications such as, for example, splicing together lengths of wire or cable and protecting, sealing, and/or insulating substrates from adverse environmental conditions. Examples of industries that use cold shrinkable articles include the automobile, aerospace, power, telecommunication, chemical, and defense industries.

It is known to form cold shrinkable articles from elastomeric compositions that include an elastomer to facilitate expansion and contraction of the article. Examples of known elastomers employed in cold shrinkable articles include EPDM rubber or silicone rubber. A problem in the art has been producing compositions that maintain desirable elongation-at-break and desirable permanent set properties in high temperature conditions.

SUMMARY OF THE INVENTION

Embodiments of the invention include a composition that achieves desirable elongation-at-break and desirable permanent set properties in high temperature conditions.

For example, embodiments can include an elastomeric composition including a fluoroelastomer composition, where the elastomeric composition is substantially free of an epichlorohydrin composition. Also, for example, embodiments can include a filler material. The filler material can include, for example, a reinforcing-grade carbon black and a silica. Also, for example, embodiments can include a peroxide curative.

For example, embodiment can include a method of use. Embodiments of the method can include providing an elastomeric composition including a fluoroelastomer composition, where the elastomeric composition is substantially free of an epichlorohydrin composition. Embodiments can also include providing a filler material including a reinforcement-grade carbon black. Embodiments can also include providing a peroxide curative. Embodiments can also include mixing the elastomeric composition, the filler material, and the peroxide curative to form a blend composition. Embodiments can also include curing the blend composition to form a tubular cold shrinkable material. Embodiments can also include installing a removable core inside the tubular cold shrinkable material to support the cold shrinkable material in an expanded state.

BRIEF DESCRIPTION OF THE DRAWINGS

FIG. 7 is a perspective view of the branched cold shrinkable article of FIG. 6 in an expanded state on a plurality of cores.

FIG. 8 is a perspective view of a corrugated cold shrinkable article of the present invention.

DETAILED DESCRIPTION

Figure 1:
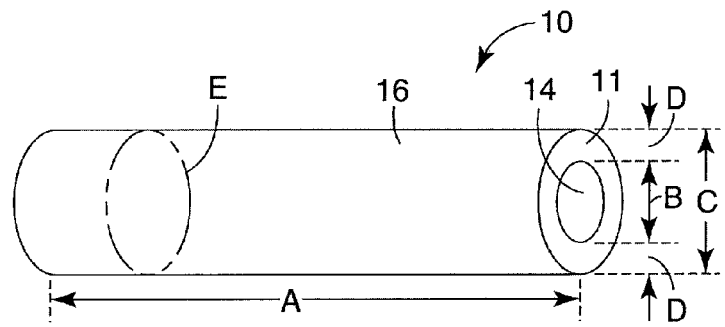
FIG. 1 is a perspective view of a cold shrinkable article of the present invention in a relaxed state, prior to expansion.

The present invention relates to an article of manufacture including a tubular cold shrinkable material formed from an elastomeric material. The term "cold shrinkable", as used herein, is defined as the capability of an article (or a portion of an article) to shrink from an expanded state toward a relaxed or a partially expanded state.

Elastomers can be included in the compositions of cold shrinkable articles to allow the cold shrinkable articles to expand from a relaxed state to an expanded state, while also allowing the articles to cold shrink back toward the relaxed state. In embodiments of the invention, for example, the elastomeric composition can include a fluoroelastomer composition, and the elastomeric composition can be free from any epichlorohydrin composition.

Unless otherwise stated, all concentrations herein are expressed in parts by weight per hundred parts by weight rubber (phr), with the rubber defined to be the total weight of the fluoroelastomer. Thus, as used herein, the phr of a particular component represents the parts by weight of the component relative to 100 total parts by weight of fluoroelastomer.

Some examples of suitable fluoroelastomers for use in the elastomeric compositions of the present invention include fluorinated elastomeric copolymers (i.e., polymers derived from two or more different monomers), fluorinated elastomeric terpolymers (i.e., polymers derived from three different monomers) and fluorinated elastomeric polymers including more than three different monomers. Some examples of suitable fluorinated elastomeric copolymers include copolymers of vinylidene fluoride, tetrafluoroethylene, and hexafluoropropylene (e.g., the DAI-EL G-801 product and the DAI-EL G-802 product, both commercially available from Daikin Industries of Osaka, Japan) and copolymers of vinylidene fluoride and tetrafluoroethane-perfluoro(methyl vinyl ether) (e.g., the VTR 8500 product or VTR 8650 product, both commercially available from Dupont-Dow Elastomer of Wilmington, Del.). Examples of suitable fluorinated elastomeric terpolymers include terpolymers of tetrafluoroethylene, hexafluoropropylene and vinylidene fluoride. In some embodiments, the fluoroelastomer may be modified with iodine or another material to facilitate cross-linking of the fluoroelastomer.

Besides fluoroelastomer, the elastomeric compositions of the present invention may also include additional optional materials such as reinforcement-grade (reinforcing) filler materials, fluoroplastics in addition to fluoroelastomers, pigments, energy-beam absorbents, antioxidants, stabilizing agents, fillers, oils, processing aids, neutralizers, rheology modifiers, silane coupling agents, cross-linking materials (e.g., cross-linking agents, cross-linking co-agents, and cure accelerators), lubricants, flame retardants, flame retardant synergists, antimicrobials, any other additive known in the art, and any combination of these in any proportion. The concentration of these additional materials in the elastomeric composition of the present invention may be any concentration sufficient to provide a desired result.

Reinforcement-grade (reinforcing) filler material may optionally be included in the elastomeric composition of the present invention to enhance the split and tear properties of cold shrinkable articles (formed from the elastomeric composition) at elevated temperatures. Examples of suitable filler materials include silica-based reinforcement filler, reinforcement-grade carbon black, fluoroplastics, clays, and any combination of any of these in any proportions.

As used herein, the term "silica-based reinforcement filler" is defined to include all compounds of the formula $SiO_2$ (e.g., pure silica); all compositions that include at least about ten weight percent of $SiO_2$ and/or an $SiO_2$ derivative, based upon the total weight of the composition; all silicates; and any combination of any of these in any proportion. Examples of suitable silica-based reinforcement fillers include silica (also referred to as silicon dioxide); silane-treated silica; fumed silica (e.g., such as the CABOSIL® M-5 product commercially from Cabot Corporation of Billerica, Mass.); silane-treated fumed silica such as, for example, the AEROSIL® R972 product, the AEROSIL® R974 product, and the AEROSIL® 200 product that are all commercially available from Degussa Company of Parsippany, N.J. and the CABOSIL® line of silane-treated fumed silica products commercially from Cabot Corporation of Billerica, Mass.; silicates; and any combination of any of these in any proportion. Examples of suitable silicates include calcium silicate, aluminum silicate, and mixtures of these. In some embodiments, the average particle size of the silica-based reinforcement filler may be less than about 30 nanometers (nm). In other embodiments, the average particle size of the silica-based reinforcement filler may be as low as about 10 nm and as high as about 20 nm.

The phrase "reinforcement-grade carbon black" as used herein, includes any carbon black with an average particle size smaller than about 40 nm, which corresponds to an average surface area of about 65 $m^2/g$. Some particularly suitable average particle sizes for reinforcement-grade carbon black range from about 9 nm to about 40 nm. Carbon black that is not reinforcement grade include carbon black with an average particle size larger than about 40 nm. As shown in Table 1, some examples of suitable reinforcement-grade carbon black include, for example, N-100 series carbon black, N-200 series carbon black, and N-300 series carbon black, which are all commercially available from Cabot Corporation of Billerica, Mass.

TABLE 1

| Name | Abbrev. | ASTM Desig. | Particle Size nm |
| --- | --- | --- | --- |
| Super Abrasion Furnace | SAF | N110 | 20–25 |
| Intermediate SAF | ISAF | N220 | 24–33 |
| High Abrasion Furnace | HAF | N330 | 28–36 |
| Easy Processing Channel | EPC | N300 | 30–35 |
| Fast Extruding Furnace | FEF | N550 | 39–55 |
| High Modulus Furnace | HMF | N683 | 49–73 |
| Semi-Reinforcing Furnace | SRF | N770 | 70–96 |
| Fine Thermal | FT | N880 | 180–200 |
| Medium Thermal | MT | N990 | 250–350 |

Elastomers including a filler material of reinforcement-grade carbon black can offer improved tensile strength, improved modulus, greater stiffness, and increased resistance to abrasive wear. On the other hand, elastomers including a carbon black filler material that is not reinforcement-grade may not exhibit the enhanced properties or characteristics that are exhibited by reinforcement-grade carbon blacks, as illustrated in the Examples corresponding to Tables 2-4. Embodiments of the present invention demonstrate that reinforcement-grade carbon black offers advantageous mechanical properties when utilized with fluoroelastomers at both room temperature and elevated temperatures, as illustrated in the Examples corresponding to Tables 2-4.

Examples of fluoroplastics that may serve as (or as part of) the reinforcement-grade (reinforcing) filler material include homopolymers of tetrafluoroethylene monomers, any copolymer that includes a tetrafluoroethylene monomer, any terpolymer that includes a tetrafluoroethylene monomer, any other polymer that includes a tetrafluoroethylene monomer and three or more different monomers, and any combination of any of these in any proportion. Examples of suitable copolymers include copolymers of tetrafluoroethylene and hexafluoropropylene (e.g., the ZONYL® MP 1500 product commercially available from DuPont Fluoroproducts of Wilmington, Del.).

Examples of suitable clay fillers that may serve as (or as part of) the reinforcement-grade (reinforcing) filler material include silane-treated kaolin clay (aluminum silicate) fillers commercially available from Engelhard Corporation of Iselin, N.J. under the trade designations "Translink 37", "Translink 77", "Translink 445", "Translink 555", and "Translink HF-900".

In some embodiments of the invention, the concentration of the filler material can be in the range of about 10 phr to about 25 phr. For example, if the filler materials include only a fumed silica, the fumed silica can be in the range of about 10 phr to about 25 phr. Also, for example, if the filler materials include only a reinforcement-grade carbon black, the reinforcement-grade carbon black can be in the range of about 10 phr to about 25 phr. Also, for example, if the filler materials include both a fumed silica and a reinforcement-grade carbon black, the concentration of the combination of filler materials can be in the range of about 10 phr to about 25 phr.

The elastomeric composition of the cold shrinkable material can also include an energy beam absorbent. The energy beam absorbent can provide for an energy beam induced indicia charred on an external surface of the cold shrinkable material responsive to application of a focused energy beam on the energy beam absorbent. Examples of suitable energy beam absorbents for use in the elastomeric compositions of the present invention include PolyOne Material No. AD 3000051160 ("Stan-Tone MB-27838 Black"), PolyOne Material Product No. CC10041306WE, and "Stan-Tone MB-29293" (all available from PolyOne Corporation of Suwanee, Ga.); RTP Material No. RTP 0299 x 102892 SSL-801191, available from RTP Company of Winona, Minn.; Clariant Material No. 00025275, available from Clariant Masterbatches Division of Albion, Mich.; Ticona Material No. 1000-2LM ND3650, available from Ticona of Summit, N.J.; BASF Material No. NPP TN020327 ("Ultramid B3K LS Black 23189"), available from BASF Corporation Performance Polymers of Mt. Olive, N.J.; and combinations thereof. These energy beam absorbent materials may include titanium dioxide, mica, and combinations thereof. Titanium dioxide may function as both a pigment and an energy beam absorbent, as discussed in Birmingham, Jr. et al., U.S. Pat. No. 5,560,845.

The elastomeric compositions of the present invention may include a pigment or combination of pigments to affect a base color of cold shrinkable articles formed from the elastomeric compositions of the present invention. Examples of suitable pigments include titanium dioxide; carbon black; zinc oxide; pression blue; cadimum sulfide; iron oxide; chromates of lead, zinc, barium, and calcium; azo; thioindigo; anthraquinone; anthoanthrone; triphenonedioxazine; fat dye pigments; phthalocyanine pigments, such as copper phthalocyanine pigment and its derivatives; quinacridon pigment; pigments commercially available under the trade designations "Cinquasia", "Cromophtal", "Filamid", "Filester", "Filofin", "Hornachrome", "Horna Molybdate", "Hornatherm", "Irgacolor", "Irgalite", "Irgasperse", "Irgazin", "Micranyl", "Microlen", "Microlith", "Microsol", and "Unisperse", all from Ciba Specialty Chemicals of Tarrytown, N.Y.; and any combination of any these in any proportion. In some embodiments, the color and concentration of pigment(s) incorporated within the elastomeric composition may depend upon how much energy beam absorbent is incorporated. As one example, a yellow-color pigment may be used in combination with an energy beam absorbent to yield cold shrinkable articles that, when exposed to a focused energy beam, exhibit high-contrast energy-beam induced indicia.

Examples of suitable antioxidants for use in the elastomeric compositions of the present invention include solutions of zinc 2-mercaptotoluimidazole in petroleum process oil (e.g., "Vanox ZMTI" and "Vanox MTI" commercially available from R.T. Vanderbilt Company, Inc. of Norwalk, Conn.); mixtures of octylated diphenylamines (e.g. "Agerite Stalite" commercially available from R.T. Vanderbilt Company, Inc. of Norwalk, Conn.); phenolic-based antioxidants (e.g., IRGANOX® 1010 commercially available from Ciba Specialty Chemicals); aromatic amine type antioxidants (e.g., NAUGARD® 445 commercially available from Crompton Corporation of Middlebury, Conn.); and combinations of these.

Examples of oils that may suitably be included in elastomeric compositions of the present invention include hydrocarbon oils (e.g. polychlorotrifluorethylene) commercially available from Halocarbon Production Corporation of River Edge, N.J. under the trade designation Halocarbon 95).

Examples of some suitable cross-linking agents for the elastomeric compositions include amines and peroxides, including peroxide curatives, such as the following peroxides that are commercially available from R.T. Vanderbilt Company, Inc. of Norwalk, Conn.; dicumyl peroxide (e.g., the VAROX® DCP product, the VAROX® DCP-40C product, the VAROX® DCP-40KE product, and the VAROX® DCP-40KE-HP product); benzoyl peroxide (e.g., the VAROX® ANS product); dibenzoyl peroxide (e.g., the VAROX® A 75 product); 2,5-dimethyl-2,5-di(t-butylperoxy) hexane (e.g., the VAROX® DBPH product, the VAROX® DBPH 40 MB product, the VAROX® DBPH-50 product, the VAROX® DBPH-50-HP product, the VAROX® DBPH-P20 product, and the VAROX® DCP-40KE product); t-butyl perbenzoate (e.g., the VAROX® TBPB product and the VAROX® TBPB-50 product); 2,5-dimethyl-2,5-di(t-butylperoxy) hexyne-3 (e.g., the VAROX® 130 product and the VAROX® 130-XL product); alpha, alpha-bis(t-butylperoxy)diisopropylbenzene (e.g., the VAROX® VC-R product); di-(2-tert-butylperoxyisopropyl) benzene (e.g., the VAROX® 802-40C product, the VAROX® 802-40KE product, and the VAROX® 802-40KE-HP product); di-(2-tert-butylperoxyisopropyl) benzene in EPR (e.g., the VAROX® 802-40MB product); derivatives of any of these; and any combination of these in any proportion.

Examples of suitable cross-linking agent concentrations in the elastomeric compositions, such as for example Varox peroxide curative, range from as low as about 1 phr to as high as about 6 phr.

Cross-linking co-agents may be incorporated in the elastomeric compositions of the present invention to enhance the cross-linking reaction. Examples of suitable cross-linking co-agents for incorporation in the elastomeric compositions include triallyl isocyanurates (e.g., the TAIC DLC-A product commercially available from Natrochem Inc. of Savannah, Ga.) and acrylic co-agents. Examples of suitable acrylic co-agents include multi-functional monomers, such as difunctional and trifunctional monomers. Examples of suitable difunctional monomers include the following, which are commercially available from Sartomer Company, Inc., Exton, Pa.: 1,3-butylene glycol diacrylate, 1,3-butylene glycol dimethacrylate, 1,4-butanediol diacrylate, 1,4-butanediol dimethacrylate, 1,6 hexanediol diacrylate, 1,6 hexanediol dimethacrylate, aliphatic dimethacrylate monomer, alkoxylated aliphatic diacrylate, alkoxylated cyclohexane dimethanol diacrylate, alkoxylated cyclohexane dimethanol diacrylate, alkoxylated cyclohexane dimethanol diacrylate, alkoxylated hexanediol diacrylate, alkoxylated hexanediol diacrylate, alkoxylated hexanediol diacrylate, alkoxylated neopentyl glycol diacrylate, alkoxylated neopentyl glycol diacrylate, aromatic dimethacrylate monomer, caprolactione modified neopentylglycol hydroxypivalate diacrylate, caprolactone modified neopentylglycol hydroxypivalate diacrylate, cyclohexane dimethanol diacrylate, cyclohexane dimethanol dimethacrylate, diethylene glycol diacrylate, diethylene glycol dimethacrylate, dipropylene glycol diacrylate, ethoxylated (10) bisphenol alpha diacrylate, ethoxylated (2) bisphenol alpha dimethacrylate, ethoxylated (3) bisphenol alpha diacrylate, ethoxylated (30) bisphenol alpha diacrylate, ethoxylated (30) bisphenol alpha dimethacrylate, ethoxylated (4) bisphenol alpha diacrylate, ethoxylated (4) bisphenol alpha dimethacrylate, ethoxylated (8) bisphenol alpha dimethacrylate, ethoxylated bisphenol alpha dimethacrylate, ethoxylated bisphenol alpha dimethacrylate, ethoxylated(10) bisphenol dimethacrylate, ethoxylated(6) bisphenol alpha dimethacrylate, ethylene glycol dimethacrylate, hydroxypivalaldehyde modified trimethylolpropane diacrylate, neopentyl glycol diacrylate, neopentyl glycol dimethacrylate, polyethylene glycol (200) diacrylate, polyethylene glycol (400) diacrylate, polyethylene glycol (400) dimethacrylate, polyethylene glycol (600) diacrylate, polyethylene glycol (600) dimethacrylate, polyethylene glycol dimethacrylate, polypropylene glycol (400) dimethacrylate, propoxylated (2) neopentyl glycol diacrylate, tetraethylene glycol diacrylate, tetraethylene glycol dimethacrylate, tricyclodecane dimethanol diacrylate, triethylene glycol diacrylate, triethylene glycol dimethacrylate, tripropylene glycol diacrylate, tripropylene glycol diacrylate, and combinations thereof. Examples of suitable trifunctional monomers include trimethylolpropane trimethacrylate, trimethyolpropane triacrylate, and combinations thereof. Examples of suitable cross-linking co-agent concentrations in the elastomeric compositions of the present invention range from as low as about 0.5 phr and as high as about 4.5 phr, on a weight basis.

The elastomeric composition of the cold shrinkable material can be prepared by blending the components of the elastomeric composition, including the fluoroelastomer, in an appropriate mixing apparatus. For example, the components of the elastomeric composition may generally be combined in any order in an appropriate mixing apparatus at a component temperature of about 60° C.

Additional optional materials may also be included with the fluoroelastomer prior to mixing. If cross-linking agents or cross-linking co-agents are to be incorporated in the elastomeric composition, the components including the fluoroelastomer may be blended together in a first mixing step as described above. The cross-linking agents and/or cross-linking co-agents may then be blended into the elastomeric composition in a second mixing step at a lower temperature than the first mixing temperature, such as between about 50° C. and about 100° C., to prevent premature cross-linking.

The elastomeric composition may then be formed into a cold-shrink article by any suitable process such as, for example, extrusion or molding. In some embodiments, the elastomeric composition of the cold-shrink article is cured, using a suitable curing process, to affect cross-linking of the elastomeric composition. Some examples of suitable curing processes include, for example, elevated temperature and pressure conditions (e.g., autoclaving), irradiation, or any other suitable curing process known in the art.

In some embodiments, the cold-shrink article may be autoclaved in an oxygen-free and/or water-free atmosphere, with the oxygen-free and/or water-free atmosphere being used in place of steam. As used herein, unless otherwise stated, the term "oxygen-free atmosphere" refers to an atmosphere of a set volume of gas that includes less than about one volume percent oxygen, based on the total volume of the gas in the atmosphere, and the term "water-free atmosphere" refers to an atmosphere of a set volume of gas that includes less than about 0.1 volume percent water vapor, based on the total volume of the gas in the atmosphere. Examples of oxygen free-atmospheres include atmospheres including greater than about 99% by volume of nitrogen gas, argon gas, helium gas, xenon gas, neon gas, any other suitable inert gas, and combinations of any of these in any proportion. For example, tubing of the present invention may be autoclave-cured in a mold. As used herein, the term "tubing" refers to a hollow cylinder open on both ends. In one embodiment, the tubing is first formed (e.g., by extrusion) and then placed inside spiral grooves of an aluminum mold. The mold is placed in a heated press and subjected to a temperature of about 185° C. and a pressure ranging from about 5-14 megapascals (Mpa) (about 75-200 psi). One end of the tubing is connected to a pressurized nitrogen gas supply containing about 99.5% nitrogen gas by volume. The mold may be purged for about two minutes with the pressurized nitrogen gas supply at a flow rate of about 40 cubic ft of the pressurized nitrogen gas. Any other purge time and flow rate sufficient to reduce oxygen and/or moisture to acceptable levels may also be used. After the initial purging, the mold is sealed off, and the pressure inside the mold may be maintained at about 200 pounds per square inch (psi) for about 20 minutes. The mold is then released and the pressure in the mold is allowed to return to atmospheric pressure. The tubing may then be removed from the mold and cooled.

The elastomeric compositions of the present invention may be formed into cold shrinkable articles of any shape or geometric configuration known in the art. Some non-exhaustive examples of cold shrinkable articles include tubing, plaques, and multiple-branched structures (i.e., tube-like structures with multiple entrances and/or exits).

Cold shrinkable articles formed from elastomeric compositions of the present invention may exhibit various advantageous mechanical properties in various combinations under various environmental conditions (e.g., room temperature or 150° C.). The cold shrinkable material formed from the elastomeric composition exhibit improved elongation, permanent set, and tear properties while in expanded states at elevated temperatures. Some embodiments of cold shrinkable articles of the present invention may be exposed, in an expanded state, to temperatures of at least about 150° C. for an extended period of time without exhibiting, upon unaided visual inspection by a human eye, any splitting, tearing, or breakage.

For example, in some embodiments, a cold shrinkable material can include an elastomeric composition including a fluoroelastomer, and the fluoroelastomer is mixed with a reinforcement-grade carbon black, a fumed silica, and a peroxide curative. After the entire processing of the elastomeric article is completed, including the proper peroxide curing process, the resultant elastomeric composition can exhibit advantageous properties, in particular, for cold shrink materials.

In some embodiments, a proper weight percent of reinforcement-grade carbon black, fumed silica, and peroxide curative should be maintained to establish desirable elongation-at-break properties and desirable permanent set properties even while experiencing high temperature conditions. For example, too high a percentage of peroxide may result in undesirably high permanent set properties, and too low a percentage of peroxide may result in undesirably low elongation properties. Also for example, too high a percentage of carbon black and/or silica filler material may result in undesirably low elongation properties, and too low a percentage of carbon black and/or silica filler material may result in undesirable performance in high temperature conditions. Therefore, in some embodiments, the quantity of the filler material (carbon black and/or silica) is in the range of about 10 phr to about 25 phr, and the quantity of peroxide curative is in the range of about 1 phr to about 6 phr. Such a combination results in advantageous properties of elongation greater than about 500% and permanent set less than about 25% at room temperature; elongation greater than about 450% and permanent set less than about 25% at 130 degrees Celsius; and elongation greater than about 400% and permanent set less than about 25% at 150 degrees Celsius. Additionally, such a combination results in a cold shrinkable material which does not tear while being held for seven days in a 200% radially expanded state at 150 degrees Celsius.

Also, various embodiments of the cold shrinkable articles of the present invention exhibit chemical resistance to substances such as, for example, diesel fuel and hydraulic fluid. Some embodiments of the cold shrinkable articles of the present invention exhibit a percent weight increase of less than about 25% when immersed in diesel fuel at about 49° C. for 24 hours and/or a percent weight increase of less than about 10% when immersed in hydraulic fluid at about 71° C. for 24 hours.

In reference to the Figures, a tubular cold shrinkable article 10 of the present invention is depicted in FIG. 1 in an initial relaxed state prior to any expansion. The cold shrinkable article 10 includes a radial wall 11, an inner surface 14, and an outer surface 16.

When cold shrinkable article 10 is in the initial relaxed state, the radial wall 11 has a longitudinal length A, an inner diameter B, an outer diameter C, and a layer thickness D. The longitudinal length A and the inner diameter B may vary based upon individual needs of a given application, such as for example, the dimensions of a substrate about which the cold shrinkable article 10 will be placed. The outer diameter C is generally determined by the inner diameter B and the layer thickness D, where the layer thickness D is ordinarily substantially uniform both around a circumference E and along the length A of the cold shrinkable article 10. The layer thickness D is desirably thin enough to allow the cold shrinkable article 10 to readily expand from the initial relaxed state upon application of expansion forces.

Examples of suitable layer thickness D range from as low as about 0.060 inches to as high as about 0.25 inches. Examples of suitable inner diameter B range from as low as about 0.2 inches to as high as about 3 inches.

Figure 2:
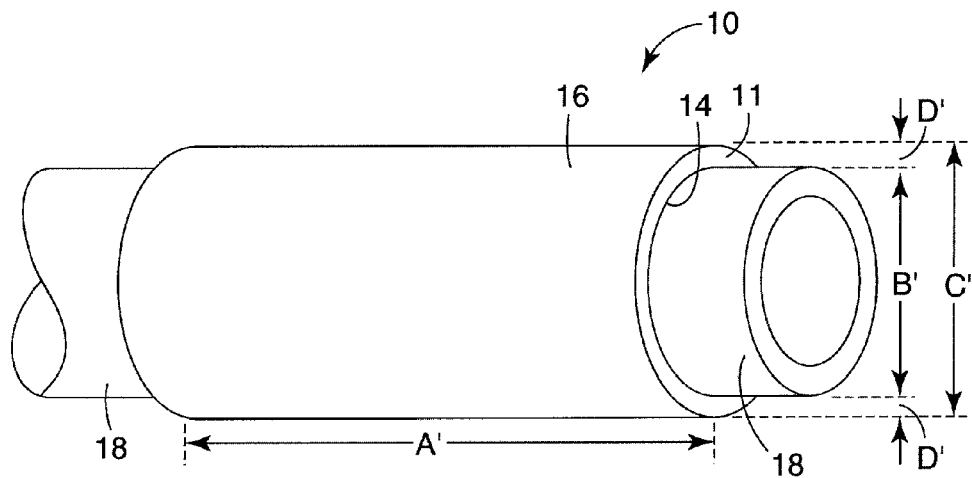
FIG. 2 is a perspective view of the cold shrinkable article of FIG. 1 in an expanded state on a core.
Figure 3:
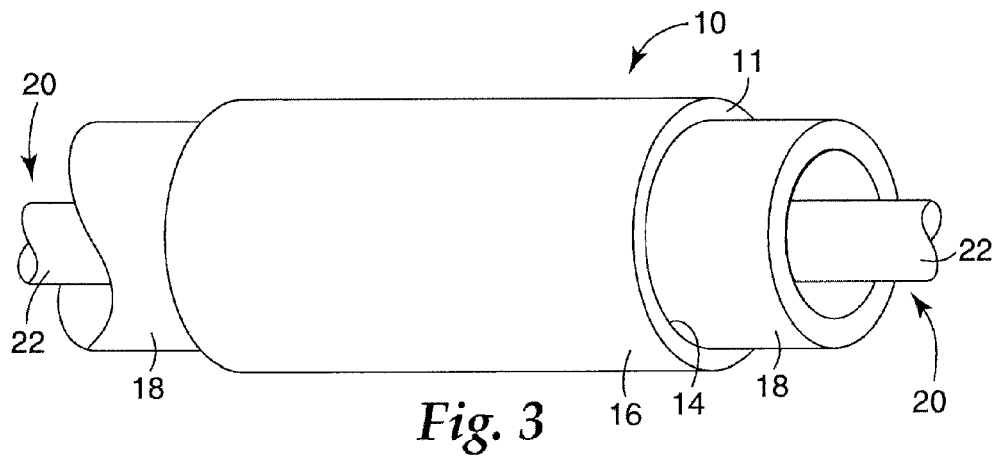
FIG. 3 is a perspective view of the cold shrinkable article of FIG. 1 in an expanded state on the core of FIG. 2, with an associated substrate.
Figure 4:
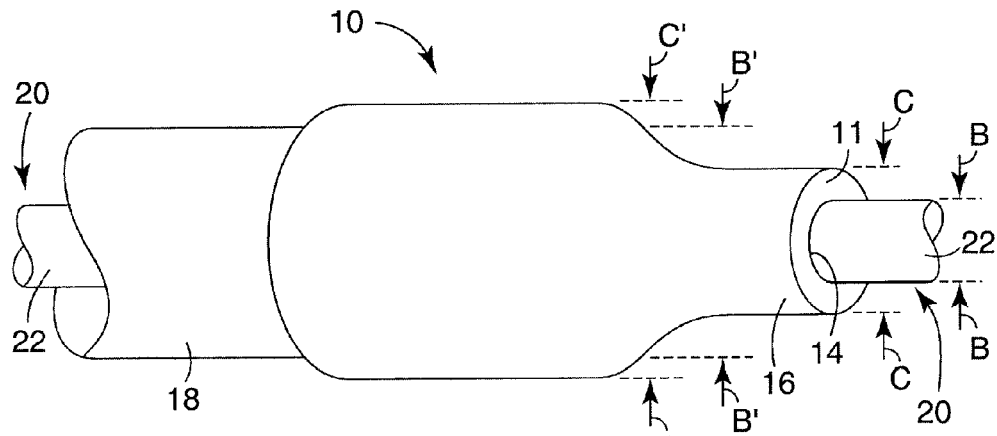
FIG. 4 is a perspective view of the cold shrinkable article of FIG. 1 partially located on the core of FIG. 2 and partially deployed on the substrate of FIG. 3.
Figure 5:
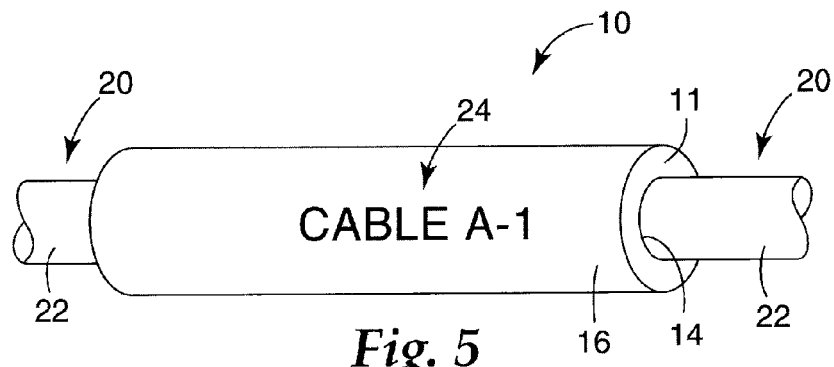
FIG. 5 is a perspective view of the cold shrinkable article of FIG. 1 including indicia and fully deployed on the substrate of FIG. 3.

Various stages of a method for deploying the cold shrinkable article 10 are depicted in FIGS. 2-5. The tubular cold shrinkable material 10 can be disposed on a removable core 18. The removable core 18 supports the cold shrinkable material 10 in an expanded state. The cold shrinkable article 10 is depicted in an expanded state on the removable core 18 in FIG. 2. A substrate 20 is shown in FIG. 3 to be inserted into the core 18, which supports the expanded form of the cold shrinkable article 10. The cold shrinkable article 10 partially deployed from the core 18 onto the substrate 20 is depicted in FIG. 4. The cold shrinkable article 10 fully deployed on the substrate 20 is depicted in FIG. 5. The cold shrinkable article 10 may protect substrate 20 and/or may identify the substrate 20, which may, for example, comprise a wire, a cable, a fluid-carrying pipe, or a conduit.

To deploy the cold shrinkable article 10 on the substrate 20, the cold shrinkable article 10 is first cross-sectionally (or radially) expanded from the initial relaxed state to the expanded state and oriented on the core 18, as depicted in FIG. 2. As used herein, the terms "expanded", "expansion", "expanded state", and the like, refer to a cross-sectional expansion that increases inner diameter B and outer diameter C, as opposed to a longitudinal expansion that increases longitudinal length A, though such a longitudinal expansion is permissible. The cold shrinkable article 10 may be expanded and placed onto the core 18 in any conventional manner. The core 18 may generally have any structure that is suitable for retaining the cold shrinkable article 10 in the expanded state. For example, the core 18 may be a rigid, hollow, plastic tube.

When the cold shrinkable article 10 is in the expanded state, as best depicted in FIG. 2, the radial wall 11 has a longitudinal length A', an inner diameter B', an outer diameter C', and a wall thickness D'. Due to the expansion, the inner diameter B' and the outer diameter C' are larger than the inner diameter B and the outer diameter C, respectively. Suitable expansion of the cold shrinkable article 10 may generally range from about 150% to about 400%, where the expansion is characterized in terms of the percent expansion of the inner diameter B relative to the inner diameter B'. Particularly suitable expansion of the cold shrinkable article 10 may generally range from about 200% to about 300%.

The substrate 20 may be inserted within the core 18 holding the expanded form of the cold shrinkable article 10, as depicted in FIG. 3. In some embodiments, the substrate 20 may be centered within the hollow portion of the core 18 using guide fingers (not shown) contained within the core 18. After the substrate 20 is inserted within the core 18, the cold shrinkable article 10 is conveyed from the core 18 onto the substrate 20, as depicted in FIG. 4. The conveyance may be accomplished in a variety of manners, such as by sliding the cold shrinkable article 10 from the core 18 onto the substrate 20, or by collapsing and removing the core 18 and thereby allowing the cold shrinkable article 10 to encompass and come into engagement with the substrate 20.

When the cold shrinkable article 10 is removed from the core 18, the cold shrinkable article 10 cold shrinkables from the expanded state toward (but not necessarily all the way to) the initial relaxed state. Whether or not the cold shrinkable article 10 reaches the relaxed state depends on the diameter of the substrate 20. The substrate 20 may have a diameter that allows the cold shrinkable article 10 to substantially return to the initial relaxed state and substantially regain the inner diameter B and the outer diameter C, as best depicted in FIG. 4. The inner diameter B of cold shrinkable article 10 in the initial relaxed state may be slightly smaller than the exterior diameter of the substrate 20, which prevents the cold shrinkable article 10 from fully shrinking back to the initial relaxed state, and thereby provides a snug and secure fit and engagement of the cold shrinkable article 10 onto peripheral surfaces of the substrate 20. When the cold shrinkable article 10 is fully deployed on the substrate 20, the inner surface 14 of the cold shrinkable article 10 extends around, faces, and is typically in contact with the outer surface 22 of the substrate 20, as shown in FIG. 5.

In some embodiments, the outer surface 16 of the cold shrinkable article 10 may include identifiers in the form of optional indicia 24, which may provide, for example, information relating to the cold shrinkable article 10 and/or the substrate 20. The indicia 24 may be a single mark or a plurality of marks, and may include a variety of textual (i.e., alphanumeric) or graphical characters, symbols, and the like. The indicia 24 may also be or include machine-readable indicia, such as bar codes. Also, the indicia 24 may have a surface texture that is different from the texture of portions of the outer surface 16 other than the indicia 24.

The indicia 24 may be formed using any suitable process including, for example, ink application to the outer surface 16 and/or focused energy beam marking of the outer surface 16. A focused energy beam refers to a directionally focused stimulated emission of radiation, such as a laser beam, to produce, a charring indicia on the external surface of the cold shrinkable material. The indicia 24, in the form of energy-beam induced indicia, may be formed, for example, by expanding the cold shrinkable article 10 from the initial relaxed state, marking the outer surface 16 by application of energy from a focused energy beam, and allowing the cold shrinkable article 10 to cold shrinkable back toward the initial relaxed state.

To facilitate formation of energy-beam induced indicia, the elastomeric compositions of the present invention may include an energy beam absorbent. Such energy beam absorbents, upon heating by a focused energy beam, may be employed to provide the indicia 24 with a different color than the color of the outer surface 16 other than the indicia. In this way, the color of the indicia 24 may contrast with the color of the outer surface 16 so the indicia are prominent and legible. If a high visual legibility of the indicia 24 is desired, both a pigment and an energy beam absorbent may be included in the elastomeric composition to provide a high contrast between the base color of the outer surface 16 and the contrasting color of the indicia 24. For further discussion regarding energy-beam induced identifiers and methods for marking cold shrinkable articles, see Publication No. US 2005/0214491 A1 published on Sep. 29, 2005, and entitled "Cold-Shrink Marker Sleeve."

In some embodiments, indicia 24 are legible to an unaided eye of an individual with 20/20 vision located at least about 36 centimeters away from indicia 24 when the cold shrinkable article 10 is in an expanded state or a relaxed state.

Information pertaining to the cold shrinkable article 10 and/or the substrate 20 may also be conveyed to a user by a base color of the outer surface 16 of the cold shrinkable article 10. For example, a blue base color of the outer surface 16 may convey different information to a user than a yellow or black base color. In some embodiments, the cold shrinkable article 10 may include both the indicia 24 and an information-conveying base color of the outer surface 16.

Figure 6:
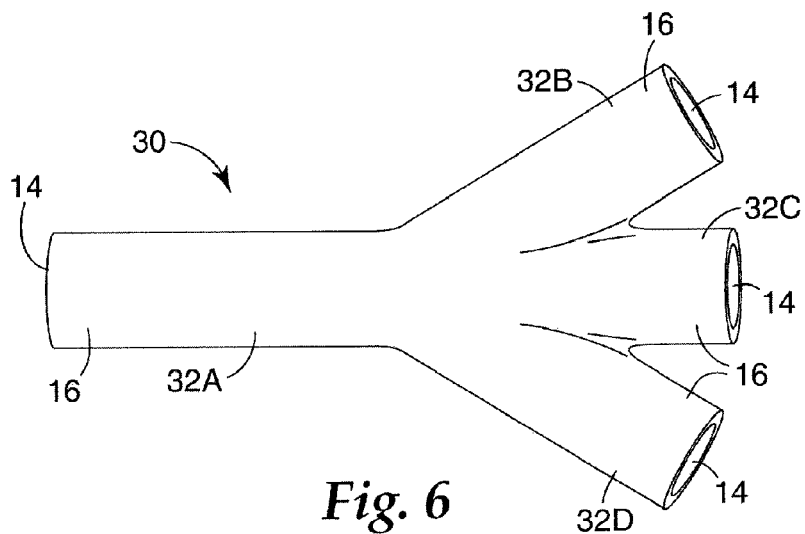
FIG. 6 is a perspective view of a branched cold shrinkable article of the present invention in a relaxed state prior to expansion.

Cold shrinkable articles of the present invention may include a plurality of elastomeric members. A branched cold shrinkable article 30 of the present invention, in a relaxed state prior to expansion, is depicted in FIG. 6. The cold shrinkable article 30 may include a plurality of hollow elastomeric portions (or members) 32A, 32B, 32C, and 32D that each have the inner surface 14 and the outer surface 16. The respective inner surfaces 14 define elongate cavities (not shown) through each of the elastomeric portions 32A, 32B, 32C, and 32D that are in communication with each other.

When the hollow elastomeric portions 32A, 32B, 32C, and 32D are stretched to the expanded state, cores 18 may be inserted within the expanded portions 32A, 32B, 32C, and 32D, as depicted in FIG. 7, to maintain the portions 32A, 32B, 32C, and 32D in the expanded state. The cold shrinkable article 30 (portions 32A, 32B, 32C, and 32D) may be deployed on one or more substrates 20 from the expanded states on the cores 18 pursuant to the methods described above in relation to deployment of the cold shrinkable article 10.

Cold shrinkable articles of the present invention may include corrugations that allow the cold shrinkable articles to exhibit a longitudinal length in a non-corrugated relaxed state that is substantially longer than the longitudinal length of the cold shrinkable articles when positioned on a removable core in an expanded, corrugated state. A cold shrinkable article 40, which is partially deployed from the core 18 onto the outer surface 22 of the substrate 20, is depicted in FIG. 8. When in the expanded state on the core 18, the cold shrinkable article 40 includes a multitude of corrugations 42. As illustrated by the cold-shrunk portion 44, after release from the core 18, unsupported corrugated portions of the cold shrinkable article 40 extend longitudinally and the corrugations formerly present in the unsupported portions effectively disappear as the cold-shrunk portion 44 approaches the initial relaxed state.

Property Analysis and Characterization Procedures

Various analytical techniques may be used to characterize the properties of cold shrinkable articles of the present invention. Details about these analytical techniques follow. As used herein, "ASTM D412" refers to ASTM D412-98a (Reapproved 2002) entitled "Standard Test Methods for Vulcanized Rubber and Thermoplastic Elastomers—Tension", which was published in January 2003 and is available from the American Society for Testing and Materials International of West Conshohocken, Pa.

I. Mechanical Property Tests

A. Elongation at Break and Stress at Break

Determinations of the stress at break and percent elongation at break for dumbbells formed from the elastomeric compositions of the present invention are performed pursuant to the procedures of Test Method A of ASTM D412 using a tensiTECH III tensile tester commercially available from Tech Pro of Cuyahoga Falls, Ohio.

A method described below similar to Test Method B of ASTM D412 may be used to determine the elongation at break for ring samples cut from tubing formed from elastomeric compositions of the present invention. According to the method employed herein, ring samples, having a longitudinal width of about 3/8 of an inch, are cut from the tubing, and the ring samples are placed in a tensile testing apparatus. Each end of each ring sample is secured to a jaw between two 0.124 inch-diameter pins attached to each jaw. The jaws of the tensile tester apparatus are then pulled in opposite directions at a rate of about 20 inches/minute and the strain and break loads are recorded. Unless otherwise stated herein, the elongation at break and stress at break tests are performed in a temperature-controlled box at a temperature of about 150° C., with the test samples conditioned for about 6±2 minutes at 150° C. before conducting the tests.

The stress at break for the ring samples is computed using the following equation:

$$\text{Actual Stress} = \frac{\text{Break Load}}{(2 \times \text{Width of Ring Sample} \times \text{Thickness of Ring Sample})}.$$

The elongation at break for the ring samples is computed using the following equation:

Actual Elongation of ID at break=((Stretched circumference−Initial circumference)/(Initial circumference))×100.

B. Percent Permanent Set

The percent permanent set test illustrates the amount of elastic recovery an article exhibits. The percent permanent set is calculated using the following equation:

$$\% \ PermanentSet = \frac{100 \times (RelaxedLength - OriginalLength)}{(TestLength - OriginalLength)}$$

To determine the percent permanent set for plaques, dumbbell test specimens are cut from plaques pursuant to the procedures of Test Method A of ASTM D-412. Parallel bench marks separated by a distance of an inch are placed at the approximate center of each dumbell. The dumbbells are placed in a set fixture and stretched until the distance between the bench marks equals 2 inches, which correlates to 100% strain. The loaded set fixture is then placed in a 100° C. oven for 3 hours. After 3 hours, the fixtures are removed from the oven and the stretched dumbbells are allowed to cool at room temperature (21° C.±2° C.) for 1 hour. The stretched dumbbells are removed from the set fixture and placed on a smooth wooden or cardboard surface. The distance between the parallel bench marks is measured after waiting 30±2 minutes. The percent permanent set is determined using the formula provided above with the original length equaling 1 inch, the test length equaling 2 inches, and the relaxed length equaling the final distance between the bench marks after cooling.

To determine the percent permanent set for tubing, ring samples having a length of 3/8 of an inch are cut from the tubing and the initial diameters of the ring samples are measured. The ring samples are then inserted over a steel mandrel having a diameter about twice the internal diameter of the tubing ring samples, which causes the ring samples to radially stretch about 100% in diameter. An end of the mandrel is equipped with a conical shape to facilitate inserting & removing the mandrel from the ring samples. While stretched on the mandrel, the ring samples are placed in a 100° C. oven for 3 hours. After expiration of the 3-hour period, the mandrel and stretched ring samples are removed from the oven and allowed to cool at room temperature (21° C.±2° C.) for 1 hour. The ring samples are then removed from the mandrel and placed on a smooth wooden or cardboard surface. The internal diameters of the ring samples are measured after passage of 30±2 minutes, and the following formula is used to compute the percent permanent set of the ring samples:

$$\% \text{ Permanent Set} = \frac{100 \ (rd - od)}{md - od},$$

where rd is the relaxed diameter, od is the original diameter, and md is the mandrel diameter.

C. Tubing Split Test

Tubing split tests are conducted to illustrate the tear properties of the cold shrinkable articles over time. The test is conducted using tubing samples prepared from elastomeric compositions of the present invention pursuant to the methods described above. Samples of tubing having a length of about 3 to 4 inches are cut and placed over steel mandrels, which have a diameter about three times the internal diameter of the tubing samples. As such, the tubing samples are expanded radially by about 200%. While retained in a state of about 200% radial expansion, the samples are placed in a 150° C. oven for seven days. After expiration of the seven-day period, the elongated samples are visually inspected for signs of tearing. Tubing samples are deemed to have failed the split test if any tearing or splitting is visually observed by an unaided human eye.

II. Fluid Resistance Tests

The fluid resistance of cold shrinkable articles of the present invention is determined by cutting dumbbell test specimens (pursuant to the methods of Test Method A of ASTM D412) from plaques formed from compositions of the present invention. The test specimens are weighed individually and then immersed in either hydraulic fluid or diesel fuel in wide test tubes. The test tubes containing the diesel fuel are placed in an oil bath maintained at a temperature of about 49° C. for 24 hours and the test tubes containing the hydraulic fluid were placed in an oil bath maintained at a temperature of about 71° C. for 24 hours. The test specimens are then removed from test tubes, padded dry with filter paper, and weighed individually. The respective percent absorptions of diesel fuel and hydraulic fluid for the test specimens are then computed using the initial weights and the final weights of the dumbbell test specimens.

III. Laser Marking Test

The visual legibility of the indicia is qualitatively determined for cold shrinkable articles pursuant to the following procedure. Tubing without indicia, having a 1.0 mm outer diameter, is expanded onto a core with a 2.0 cm diameter. The expanded tubing is then laser marked to form indicia by a Nd:YAG laser system. The Nd:YAG laser system is commercially available under the trade name "Hi-Mark" No. 400 from GSI Lumonics, Inc. of Kanata, Ontario, Canada. The laser settings for the Nd:YAG laser system include a power setting of 64.8 watts, a rate of marking 5.1 cm/minute, and a frequency of 6 wave peaks per second. The set distance of the laser system head to the outer surface of the tubing is 18.3 cm (7.2 inches). The indicia is marked so the indicia, with the tubing in the expanded state, exhibits a type-face height in a circumferential direction about the tubing of 2.0 mm.

After marking, the tubing is removed from the core and allowed to substantially cold shrinkable back toward the relaxed state. The indicia on the tubing substantially in the relaxed state is then visually observed by an unaided human eye. The marking is determined to be acceptable if the indicia (exhibiting a type-face height of 2.0 mm) on the tubing is visually legible by an unaided human eye (i.e., about 20/20 vision) from a distance of at least about 36 cm (about 14 inches).

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from general chemical suppliers such as the Sigma-Aldrich Chemical Company of Saint Louis, Mo., or may be synthesized by conventional techniques. Also, unless otherwise stated, all performance data included herein for tubing is for tubing cured in an oxygen-free atmosphere. In addition, unless otherwise noted, all tests were performed pursuant to the property analysis and characterization procedures described above.

The following compositional abbreviations are used in the following Examples:

DAIKIN G-801: A fluoroelastomer copolymer of vinylidene fluoride and hexafluoropropylene commercially available from Daikin Industries of Osaka, Japan.

DAIKIN G-802: A fluoroelastomer copolymer of vinylidene fluoride and hexafluoropropylene commercially available from Daikin Industries of Osaka, Japan.

AEROSIL® R974: A silane-treated, fumed silica commercially available from Degussa Company of Parsippany, N.J.

N-110 Black: A reinforcement-grade carbon black commercially available from Cabot Corporation, Billerica, Mass.

N-990 Black: A non-reinforcement-grade carbon black commercially available from Cabot Corporation, Billerica, Mass.

TAIC DLC-A: A cross-linking co-agent commercially available from Natrochem, Inc. of Savannah, Ga.

Zinc Omadine: A fungicide solution of 65% 2-pyridinethiol-1-oxide, zinc complex in a paraffinic oil (i.e., Zinc Omadine), commercially available from Arch Chemicals, Inc. of Cheshire, Conn.

VAROX® DBPH-50-HP: A 2,5-dim ethyl-2,5-di(t-butylperoxy)hexane cross-linking agent peroxide curative commercially available from R.T. Vanderbilt Company of Norwalk, Conn.

The Examples concern cold shrinkable articles of the present invention in the form of tubing and plaques. The component concentrations of the elastomeric compositions used to form the cold shrinkable articles of the Examples are provided in Table 2. The elastomeric compositions of the Examples were prepared by combining the components provided in Table 2 in a first mixing step, and then mixing these components in a Banbury mixer at between about 20 and 40 revolution-per-minute for about 20 minutes at a temperature of about 60° C. The compositions were then further mixed in a 2-roll mixing mill heated to about 50° C. for about 5 minutes. The TAIC DLC-A listed in Table 2 was then added to each composition in a second mixing step and the compositions were mixed for an additional 5 minutes. The compositions were then sheeted out in conventional fashion and cooled to the ambient temperature (22-24° C.).

TABLE 2

| Components (phr) | BT 7 | BT 17 | BT 18 | LMC (Control) | LTC (Control) |
|---|---|---|---|---|---|
| Daikin G-801 | 100 | 0 | 0 | 0 | 100 |
| Daikin G-802 | 0 | 100 | 100 | 100 | 0 |
| Aerosil R974 | 5 | 5 | 10 | 0 | 0 |
| N-110 Black | 10 | 10 | 5 | 0 | 0 |
| N-990 Black | 0 | 0 | 0 | 10 | 10 |
| Zinc Oxide | 2 | 2 | 2 | 2 | 2 |
| Zinc Omadine Paste | 0.75 | 0.75 | 0.75 | 0.75 | 0.75 |
| TAIC DLCA | 4.2 | 4.2 | 4.2 | 4.2 | 4.2 |
| Varox DBPH-50HP | 2.5 | 2.5 | 2.5 | 2.5 | 2.5 |

The elastomeric compositions of the Examples were extruded into tubing having an internal diameter of about 0.25 inches and a wall thickness of about 0.18 cm using a ¾-inch extruder with a L/D ratio of 20. The extrusions were done at a barrel temperature of about 60° C. and a die temperature between about 30° C. and 60° C. The resulting tubing was cured by peroxide curing. The percent elongation at break and percent permanent set at room temperature, 130C, and 150C were determined. Also, the split resistance at 150° C. for 7 days, stress at break at 150° C. was also determined. The results of these tests are included in Tables 3 and 4.

TABLE 3

| | Compound | | |
|---|---|---|---|
| | BT 7 | BT 17 | BT 18 |
| 100% | 449 | 451 | 450 |
| 200% | 791 | 796 | 768 |
| 300% | 1238 | 1227 | 1179 |
| Tensile (psi) | 3219 | 3068 | 3033 |
| Elongation-at-break @ Room Temp | 618 | 606 | 619 |
| Permanent Set (%) | 23.3 | 23.4 | 22.8 |

TABLE 4

| Composition | Permanent Set @ 130 C. (%) | Permanent Set @ 150 C. (%) | Elongation @ 130 C. (%) | Elongation @ 150 C. (%) |
|---|---|---|---|---|
| LMC (Control) | n/a | n/a | 258 | 214 |
| LTC (Control) | n/a | n/a | 272 | 242 |
| BT 7 | 23.4 | 23.2 | 513 | 417 |
| BT 17 | 23.3 | 23.5 | 514 | 423 |
| BT 18 | 22.6 | 22.9 | 468 | 400 |

Table 3 provides data at room temperature, and Table 4 provides data at elevated temperatures. The data provided in Tables 3 and 4 illustrates the expansion capabilities, durability, and tear performance at elevated temperatures of cold shrinkable articles formed from the elastomeric compositions of the Examples. The tubing samples of the Examples each exhibited a percent permanent set of less than 25%. In addition, all tubing samples formed from each of the compositions in BT 7, BT 17, and BT 18 passed the extended split test provided in the Property Analysis and Characterization Procedures section of this document.

In addition, the tubing samples of the Examples all marked well with a YAG laser and passed the laser marking test, when tested pursuant to the laser-marking procedures including in the Property Analysis and Characterization Procedures section of this document.

Although the present invention has been described with reference to preferred embodiments, workers skilled in the art will recognize that changes may be made in form and detail without departing from the spirit and scope of the invention.

The invention claimed is:

1. A composition comprising:
   an elastomeric composition, the elastomeric composition comprising a fluoroelastomer composition, and the elastomeric composition being substantially free of an epichlorohydrin composition;
   a filler material, the filler material comprising one or both of a reinforcement-grade carbon black and a silica; and
   a peroxide curative.

2. The composition as defined by claim 1, wherein the quantity of one or both of the reinforcement-grade carbon black and silica is in the range of about 10 phr to about 25 phr, and wherein the quantity of peroxide curative is in the range of about 1 phr to about 6 phr.

3. The composition as defined by claim 1, wherein the reinforcement-grade carbon black comprises carbon black having an average particle size of less than about 40 nm.

4. The composition as defined by claim 1, wherein the silica comprises a silane treated fumed silica.

5. The article as defined by claim 1, wherein the composition further comprises a cross-linking agent or cross-linking co-agent.

6. The composition as defined by claim 1, wherein the composition exhibits an elongation greater than 50000 and a permanent set less than 25% at room temperature.

7. The composition as defined by claim 1, wherein the composition exhibits an elongation greater than 450% and a permanent set less than 25% at 130 degrees Celsius.

8. The composition as defined by claim 1, wherein the composition exhibits an elongation greater than 400% and a permanent set less than 25% at 150 degrees Celsius.

9. The composition as defined by claim 1, wherein the composition does not tear while being held for seven days in a 200% radially expanded state at 150 degrees Celsius.

10. The composition defined by claim 1, wherein the composition exhibits less than about a 25% weight increase when immersed in diesel fuel for 24 hours at a temperature of about 49 degrees Celsius.

11. The composition defined by claim 1, wherein the composition exhibits less than about a 10% weight increase when immersed in hydraulic fluid for 24 hours at a temperature of about 71 degrees Celsius.

12. A method of use comprising:
   (a) providing an elastomeric composition, the elastomeric composition comprising a fluoroelastomer composition, and the elastomeric composition being substantially free of an epichlorohydrin composition;
   (b) providing a filler material, the filler material comprising one or both of a reinforcement-grade carbon black and silica; and
   (c) providing a peroxide curative;
   (d) mixing the elastomeric composition, the filler material, and the peroxide curative to form a blend composition; and
   (e) curing the blend composition to form a tubular cold shrinkable material; and
   (f) installing a removable core inside the tubular cold shrinkable material to support the cold shrinkable material in an expanded state.

13. The method as defined by claim 12, wherein the quantity of one or both of the reinforcement-grade carbon black and silica is in the range of about 10 phr to about 25 phr, and the quantity of peroxide curative is in the range of about 1 phr to about 6 phr.

14. The method as defined by claim 12, wherein the reinforcement-grade carbon black comprises carbon black having an average particle size of less than about 40 nm.

15. The method as defined by claim 12, wherein the silica comprises a silane treated fumed silica.

16. The method as defined by claim 12, wherein the composition further comprises a cross-linking agent or cross-linking co-agent.

17. The method as defined by claim 12, further comprising exhibiting an elongation greater than 50000 and a permanent set less than 25% at room temperature.

18. The method as defined by claim 12, further comprising exhibiting an elongation greater than 450% and a permanent set less than 25% at 130 degrees Celsius.

19. The method as defined by claim 12, further comprising exhibiting an elongation greater than 400% and a permanent set less than 250% at 150 degrees Celsius.

20. The method as defined by claim 12, further comprising the absence of tearing while being held for seven days in a 200% radially expanded state at 150 degrees Celsius.

* * * * *

UNITED STATES PATENT AND TRADEMARK OFFICE
CERTIFICATE OF CORRECTION

PATENT NO. : 7,705,085 B2
APPLICATION NO. : 11/697429
DATED : April 27, 2010
INVENTOR(S) : Pradip K Bandyopadhyay It is certified that error appears in the above-identified patent and that said Letters Patent is hereby corrected as shown below:

Title page
Item [56], References Cited, OTHER PUBLICATIONS, delete "Compatability" and insert -- Compatibility -- therefore Column 5
Line 6, delete "cadimum sulfide;" and insert -- cadmium sulfide; -- therefore
Line 10, delete "quinacridon pigment;" and insert -- quinacridone pigment; -- therefore
Line 41, delete "polychlorotrifluorethylene" and insert -- polychlorotrifluoroethylene -- therefore Column 6
Line 27, delete "caprolactione" and insert -- caprolactone -- therefore
Line 56, delete "trimethyolpropane" and insert -- trimethylolpropane -- therefore Column 7
Lines 4-5, delete "fluorelastomer" and insert -- fluoroelastomer -- therefore Column 10
Line 28, delete "produce," and insert -- produce -- therefore Column 12
Line 33, delete "dumbell" and insert -- dumbbell -- therefore Column 14
Line 46, delete "5-dim ethyl" and insert -- 5-dimethyl -- therefore Column 16
Line 29, in Claim 6, delete "50000" and insert -- 500% -- therefore Column 17
Line 13, in Claim 17, delete "50000" and insert -- 500% -- therefore Signed and Sealed this Tenth Day of August, 2010

David J. Kappos
*Director of the United States Patent and Trademark Office*

CERTIFICATE OF CORRECTION (continued)
U.S. Pat. No. 7,705,085 B2

<u>Column 18</u>
Line 6, in Claim 19, delete "250%" and insert -- 25% -- therefore